US012013841B2

(12) United States Patent
Shankar et al.

(10) Patent No.: US 12,013,841 B2
(45) Date of Patent: Jun. 18, 2024

(54) APPARATUS AND METHODS FOR ANNOTATION MANAGEMENT

(71) Applicant: Bank of America Corporation, Charlotte, NC (US)

(72) Inventors: Mani Shankar, Princeton, NJ (US); Sweetee Manchanda, Princeton Junction, NJ (US)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 17/307,628

(22) Filed: May 4, 2021

(65) Prior Publication Data
US 2022/0358117 A1 Nov. 10, 2022

(51) Int. Cl.
*G06F 16/23* (2019.01)
*G06F 21/31* (2013.01)
*G06F 21/60* (2013.01)
*G06N 20/00* (2019.01)

(52) U.S. Cl.
CPC ...... *G06F 16/2379* (2019.01); *G06F 16/2343* (2019.01); *G06F 21/31* (2013.01); *G06F 21/602* (2013.01); *G06N 20/00* (2019.01)

(58) Field of Classification Search
CPC .. G06F 16/2379; G06F 16/2343; G06F 21/31; G06F 21/602; G06F 16/164; G06F 16/176; G06F 2221/2111; G06N 20/00
See application file for complete search history.

(56) References Cited

U.S. PATENT DOCUMENTS

| 9,058,317 | B1 * | 6/2015 | Gardner | G06F 40/268 |
| 2018/0173886 | A1 * | 6/2018 | Dryer | H04L 63/105 |
| 2022/0230095 | A1 * | 7/2022 | Stergioudis | G06N 3/006 |

FOREIGN PATENT DOCUMENTS

AU  2014274590 A1 *  1/2015  ......... G06F 21/6218

OTHER PUBLICATIONS

Bontcheva, GATE Teamware: a web-based, collaborative text annotation framework, pp. 1007-1029 (Year: 2013).*
Islamaj, TeamTat: a collaborative text annotation tool, pp. 5-11, May 2020.*
Yang, Yedda: A Lightweight Collaborative Text Span Annotation Tool, pp. 1-6 (Year: 2018).*
Biemann, Collaborative Web-based Tools for Multi-layer Text Annotation, pp. 1-28, Jun. 2017.*
Kehoe, eMargin: A collaborative text annotation tool, p. 263, Jun. 2012.*

* cited by examiner

*Primary Examiner* — Albert M Phillips, III
(74) *Attorney, Agent, or Firm* — Weiss & Arons LLP

(57) ABSTRACT

Apparatus and methods to manage annotation of a body of data comprising data files are provided. The apparatus and methods may include an annotation management system concurrently accessible over a network by annotators, data engineers, data scientists, and checkers. The annotation management system may include a label management module, an annotated data management module, a change management module, a navigation management module, an original document reference, a database management module, and an output management module. The apparatus and methods may include locking a data file while an annotator is applying labels but concurrently allowing others to view and manipulate the data file.

12 Claims, 10 Drawing Sheets

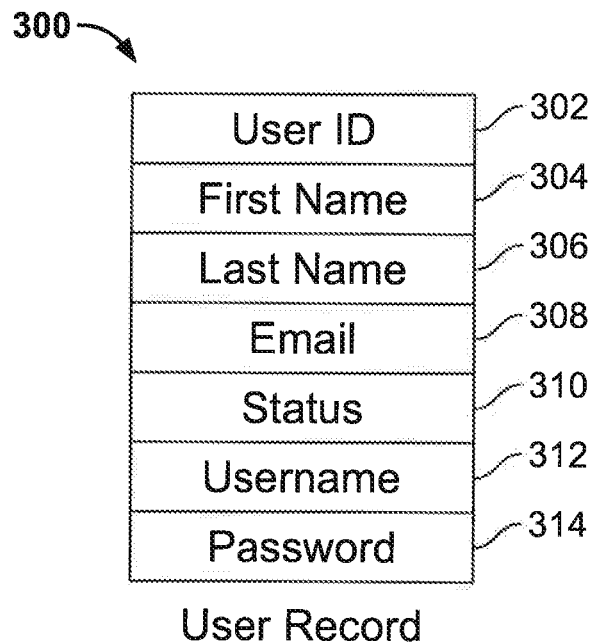
FIG. 3-1
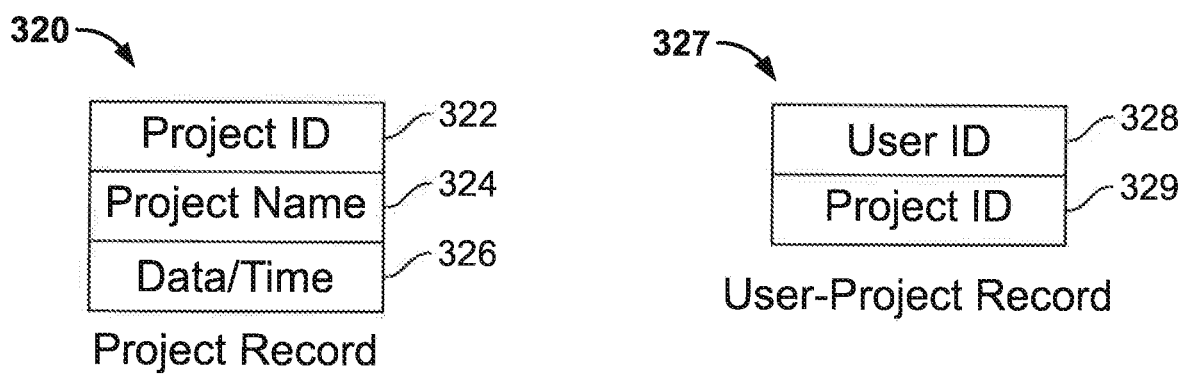
FIG. 3-2a
FIG. 3-2b

Annotation Change Record

| Label | Type | Format | Masking | Example |
|---|---|---|---|---|
| Ssn | Number(9) | 123-45-6789 | *--6789 | Social Security Number |
| Acct | Number(11) | 12-34456-7890 | 12-34456-**** | Social Customer Account Number |
| Name | Text(50) | Any | None | |
| Date | Short Date/ Long Data | mm/dd/yyyy | None | Any Date Format Acceptable by the Underlying Implementation System |
| Address | Any (150) | | | Can Include both Number and Text |
| | | | | |
| | | | | |
| | | | | |

OUTPUT6: FROM_10_1_pocr.txt from 940 for 2019 Employers is Annual Federal Unemployment FUTA tax return 850113 Department of the Treasury Internal Revenue Service OMB No. 15450028 Empl Identification *** DIGI GIGIL TE Check all that apply Name not your trade name JOHN DOE a. Amended Trade name if any JOHN DOE. Successor employer No payments to employees in Address ********** . Final Business closed or Number Street Suite or room number stopped paying wages Go to www.irs.gov From 940 for SHORNAUR 022589 instructions and the latest information City State ZIP code INDIA 10000 Foreign country name Foreign ********* Foreign postal code Read the separate instructions before you complete this from Please type or print within the boxes. Part1 tell us abort you return, If any line dose NOT apply leave it blank See instructions before completing Part 1. 1a If you had to pay state unemployment tax in one state enter the state abbreviation.1a 1b If you had tp pay state unemployment tax in more than one state you are a multistate Check here. employer.....2.2.1.ee ** Complete Schedule A Form 940. 2 If you paid wages in state is subjected CREDIT REDUCTION...... 2 Check here. Determine your FUTA tax before Adjustments. If any line dose NOT apply leave it blank.

< Previous — 810
Tags
[OMB (*)] ×  [Address(*)] ×
[Zip (*)] ×  [Country (*)] ×
Name (*) ×

Annotated Data

| TAG | Value | Start Index | End Index |
|---|---|---|---|
| OMB | 15450028 | 139 | 147 *|
| Zip | 10000 | 571 | 576 *|
| Country | ***** | 546 | 570 *|
| Address | ** ******** | 343 | 371 *|
| Name | JOHN DOE | 237 | 248 *| up | Add Tag | Save | History

APPARATUS AND METHODS FOR ANNOTATION MANAGEMENT

FIELD OF TECHNOLOGY

Aspects of the disclosure relate to providing apparatus and methods for managing annotation in a quantity of data.

BACKGROUND OF THE DISCLOSURE

Data science is a rapidly burgeoning field that is essential to the modern economy. Artificial intelligence/machine learning ("AI/ML") is a closely related field just as essential to modern living. Both data science and AI/ML rely on large quantities of data.

For example, AI/ML requires accurate data for machine training, learning, and testing. Without accurate training data, AI/ML may be limited by the 'garbage in/garbage out' philosophy.

One common method of providing accurate training data and data science data is to use annotated documents or other data. In general, a large number of high-quality training documents/data is required to train successful AI/ML algorithms, and accurately labeling/annotating the data is a critical step of data preprocessing in supervised learning, but it is an expensive and time-consuming process. Each mistake or inaccuracy negatively affects a dataset's quality and the overall performance of an AI/ML model. Annotation is typically performed by one or more annotators using a variety of computer tools to associate various labels to various contents of the large quantities of data/documents. Annotation helps to structure data in various ways to be used to train and test various AI/ML models for various applications such as document classification, text extraction, virtual assistants, and other AI/ML uses.

Currently, annotation is performed in person to provide the baseline data for AI/ML models. For example, to train an AI/ML model to extract pertinent information from a series of similar documents (such as, e.g., names and addresses of mortgage holders), a set of training documents is needed. Annotators will label the names and addresses in each training document, and the AI/ML may use the training documents to learn and refine their algorithms.

In addition, to compete and thrive in the global economy, many companies are working with geographically dispersed teams collaborating. Remote and dispersed annotating teams bring diversity, deep local knowledge, and different perspectives to annotation. In many instances, to build a successful AI/ML model, diversity in data is key to avoid biases and develop a fair and inclusive AI/ML model. A team of diverse annotators, based on their location, native language they speak, and other characteristics will help improve quality of annotation.

Training documents may number in the thousands and multiple annotators may be necessary to timely process and annotate the training data. However, current tools and programs used to annotate the data are time-consuming, clunky, inefficient, and not conducive to collaboration between geographically diverse annotators, data scientists, data engineers, computer scientists, and others. Current annotation tools do not allow (one or more of) multi-user collaboration, change tracking, security, document state and status management, in-tool navigation, and original document reference abilities.

Therefore, it would be desirable for apparatus and methods to manage annotation of a large quantity of data, that allow for at least all of the following: multi-user collaboration, change tracking, security, document state and status management, in-tool navigation, and original document reference.

SUMMARY OF THE DISCLOSURE

It is an object of this disclosure to provide apparatus and methods to manage annotation of a large body of data.

A system for managing concurrent annotation of a body of data is provided. The body of data may include two or more data files. The data files may be text-based or converted to text through any appropriate method. In an embodiment, the data files may be audio, visual, or audiovisual. The system may include one or more remote computers.

Each remote computer may include a communication link that may access a network. The network may be the Internet or an internal network, such as an intranet, without access to the Internet. The remote computer may include non-transitory memory that may store a portion of the body of data, an operating system, and an annotation management engine. The remote computer may have one or more processors coupled to the memory and configured to operate the annotation management engine and the operating system. The processor(s) may also communicate results of the annotation management engine over the network and store, in the memory the portion of the body of data and the annotated data.

The entire body of data may be stored on the remote computer or on a remote server. The server may be centralized or decentralized in various embodiments.

In an embodiment, the annotation management engine is not stored on the remote computer; rather, the engine may be accessed by the remote computer and user through a web browser or similar access program. The engine may be located on a centralized server. In an embodiment, the engine, and data, may be distributed across multiple servers.

The annotation management engine may include a label management module, an annotated data management module, a change management module, a navigation management module, a database management module, and an output management module.

In an embodiment, the label management module may allow a user, such as an annotator or a checker, to apply and remove one or more labels to the body of data to create annotated data. For example, an annotator may label a name as a name, an address as an address, an account number as an account number, a particular item as that item, etc.

In an embodiment, the annotated data management module may capture a start index and an end index of the annotated data, and it may allow a user, such as an annotator, to select a status for the annotated data. For example, an annotator or other user may select a status for a particular data file such as "Active," "Complete," "Delete," and "Needs Further Review."

In an embodiment, the change management module may capture every action performed on a particular data file. For example, the change management module may track every label added or removed, along with a date-time stamp, and user details. User details may include the identifying information of any user (such as an annotator or checker) who has annotated the file, or even simply viewed the file. In an embodiment, the change management module may generate a csv or spreadsheet report for each data file. The csv/spreadsheet may contain details about multiple data files.

In an embodiment, the navigation management module may allow a user, such as an annotator, checker, or scientist to choose a particular data file of the body of data to be annotated/labeled or viewed. In an embodiment, the navigation management module may automatically skip any data file that has a status of "Active" or "Complete." Automatically selecting the next document for an annotator to annotate/label may save time and avoid duplication of work, and it frees a user from having to manually track which document or file in the body of data has been annotated or not.

In an embodiment, the database management module may control access to a number of databases, such as a user database, a project database, an annotation database, and a change management database. The user database may include all of the annotators, checkers, data scientists and engineers, and others who have access to a particular body of data. In many situations, access to data may need to be controlled for confidentiality, privacy, or liability purposes.

In an embodiment, the output management module may allow a user to download the annotated data file(s) and some or all of the original data files in the body of data in a number of formats. For example, a typical output format may be JSON (Javascript Object Notation), a spaCy format in the Python programming language, or a csv/spreadsheet format.

In an embodiment, the annotation management engine may allow multiple annotators to annotate/label the same or separate data files of the body of data. For example, the engine may allow multiple annotators located all over the globe to access and annotate the same body of data at the same time. In an embodiment, the engine may also allow multiple data scientists and checkers to use and check the original and annotated data while multiple annotators are simultaneously annotating the body of data.

In an embodiment, the system may include an encryption controller, and the non-transitory memory may include executable instructions and at least one datum configured to authenticate the user. A typical user may need a username and a unique password or PIN to access the engine and body of data. In an embodiment, two-factor authorization may be needed. Other encryption and authentication methods may be used as appropriate.

In an embodiment, the engine and label management module may allow a user to create one or more hotkeys corresponding to one or more labels and then allow the user to apply the corresponding label when the user selects the appropriate hotkey. In an embodiment, the hotkey(s) may be shared over the network so other users may use the same hotkeys.

A method for managing simultaneous annotation of a body of data consisting of two or more data files is provided. The method may include storing, at a centralized server, the body of data. The method may include receiving, at an annotation management engine, user logins from two or more annotators. The annotation management engine may be at the centralized server (and may be accessed through a web browser or similar access program) or at one or more remote computers. Each user login may enable each annotator to select an available data file from the data files. The method may include authenticating each annotator. The method may include displaying, on a monitor near each annotator, the selected data file and a graphical user interface. The graphical user interface may allow each annotator to view the data file and annotate the data file.

The method may include receiving, at the annotation management engine, one or more annotations/labels applied by the first annotator to the data file. Annotations/labels may include, for example, a name as a name, an address as an address, an account number as an account number, a particular item as that item, etc. The annotator may save the labels/annotations.

The method may include locking, at the annotation management engine, the data file. Locking the data file may transform the data file to an annotated data file and prevent the second (or any other) annotator from applying any annotations/labels to the data file. The method may include updating the body of data with the annotated data file and generating, at the annotation management engine, a history of the annotated data file. The history may include the available data file, the annotated data file, the one or more saved labels, an identity of the one or more annotators, and any changes made by the one or more annotators to the available data file. The changes may be time and date-stamped. The history may be stored in a csv format or any other appropriate format.

The method may include unlocking, at the annotation management engine, the data file, allowing the second (or any other) annotator to apply one or more annotations/labels to the data file. For example, two or more annotators may begin working on a single data file, when one saves her annotations, the file may be temporarily locked to prevent the second annotator from applying labels until the first annotator's labels are saved and recorded, at which time the file may be unlocked, allowing the second annotator to apply and save her annotations/labels. After the first annotator's labels/annotations are saved, the second annotator may replace the first annotator in this method and the method may repeat with other data files and the same or other annotators.

In an embodiment, the method may include receiving, at the annotation management engine, a user login from a checker, authenticating the checker, and allowing the checker to view the annotated data file and the history to check the accuracy of the annotations/labels. A checker may be a supervisor or other annotator who checks the annotations/labels for accuracy as accurate annotations may be essential for robust AI/ML models. The method may include receiving a confirmation from the checker that the labels are accurate. Alternatively, the checker may correct the labels/annotations, or assign an annotator to correct the labels/annotations. The method may also include storing the confirmation and the annotated data file as a checked data file and updating the body of data with the checked data file. In an embodiment, the history of the file may also be updated with the actions of the checker.

In an embodiment, the checker may be able to view the annotated data file in real-time while an annotator, including the first or second annotators, applies one or more annotations/labels to the available data file. Viewing the application of annotations in real-time may save time checking the annotations afterwards. In addition, this may be used as a training tool to train annotators. In an embodiment, annotators and other users may be able to view the actions of a checker in real-time.

In an embodiment, the second (or any other) annotator may be able to view the action(s) (e.g., applying labels/annotations) of the first annotator on a data file in real-time. In an embodiment, the first annotator may be able to view the actions of the second (or any other) annotator in real-time.

In an embodiment, the method may include utilizing the checked data file to train an AI/ML algorithm.

In an embodiment, the method may include repeating the previously described steps until the body of data includes a checked data file for each of the data files in the entire body of data.

In an embodiment, the method may include receiving one or more instructions from the first (or any other) annotator to create a hotkey corresponding with a label/annotation. The method may include receiving instructions to apply the label when the hotkey is selected. The method may include sharing the hotkey with the second (or any other) annotator or other user. Sharing hotkeys may increase efficiency of the team.

A method for managing concurrent annotation of a body of data consisting of two or more data files is provided. The method may include storing, at a centralized server, the body of data, receiving, at an annotation management engine, a user login from an annotator enabling the annotator to select an available data file from the data files and authenticating the annotator. The method may include displaying, on a monitor near the annotator, the selected data file along with or as part of a graphical user interface. The graphical user interface may include a navigation and function taskbar, available labels (including color-coded labels), a historical data section, and the available data file. The annotator may be able to apply one or more of the available labels to the available data file.

The method may include receiving, at the annotation management engine, one or more saved labels/annotations applied by the annotator to the data file and locking, at the annotation management engine, the data file. The locking of the data file may transform the data file to an annotated data file and prevent any other annotator or user from applying any label s/annotations.

The method may include updating the body of data with the annotated data file and generating, at the annotation management engine, a history of the annotated data file. The history may include the available data file, the annotated data file, the one or more saved labels, an identity of the one or more annotators, time and date-stamps, and any changes made by the one or more annotators to the available data file. The login and authentication steps above may be repeated by a second annotator. The method may include unlocking, at the annotation management engine, the data file, allowing the second annotator to apply one or more labels/annotations to the data file and then repeating the steps of receiving, storing, locking, and updating the history with any changes made by the second annotator.

In an embodiment, the method may include receiving, at the annotation management engine, a user login from a checker, authenticating the checker, and allowing the checker to view the annotated data file and the history to check the accuracy of the labels/annotations. The method may include receiving a confirmation from the checker that the labels/annotations are accurate, storing the confirmation and the annotated data file as a checked data file, and updating the body of data with the checked data file.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 3-1 shows an illustrative user record in accordance with principles of the disclosure.

FIG. 3-2a shows an illustrative project record in accordance with principles of the disclosure.

FIG. 3-2b shows an illustrative user-project record in accordance with principles of the disclosure.

FIG. 3-3 shows an illustrative label record in accordance with principles of the disclosure.

FIG. 3-4 shows an illustrative annotation record in accordance with principles of the disclosure.

FIG. 3-5 shows an illustrative change history record in accordance with principles of the disclosure.

FIG. 4 shows an illustrative diagram in accordance with principles of the disclosure.

FIG. 5 shows an illustrative flowchart in accordance with principles of the disclosure.

FIG. 6 shows an exemplary table in accordance with principles of the disclosure.

FIG. 8 shows an exemplary user interface in accordance with principles of the disclosure.

DETAILED DESCRIPTION OF THE DISCLOSURE

Figure 1:
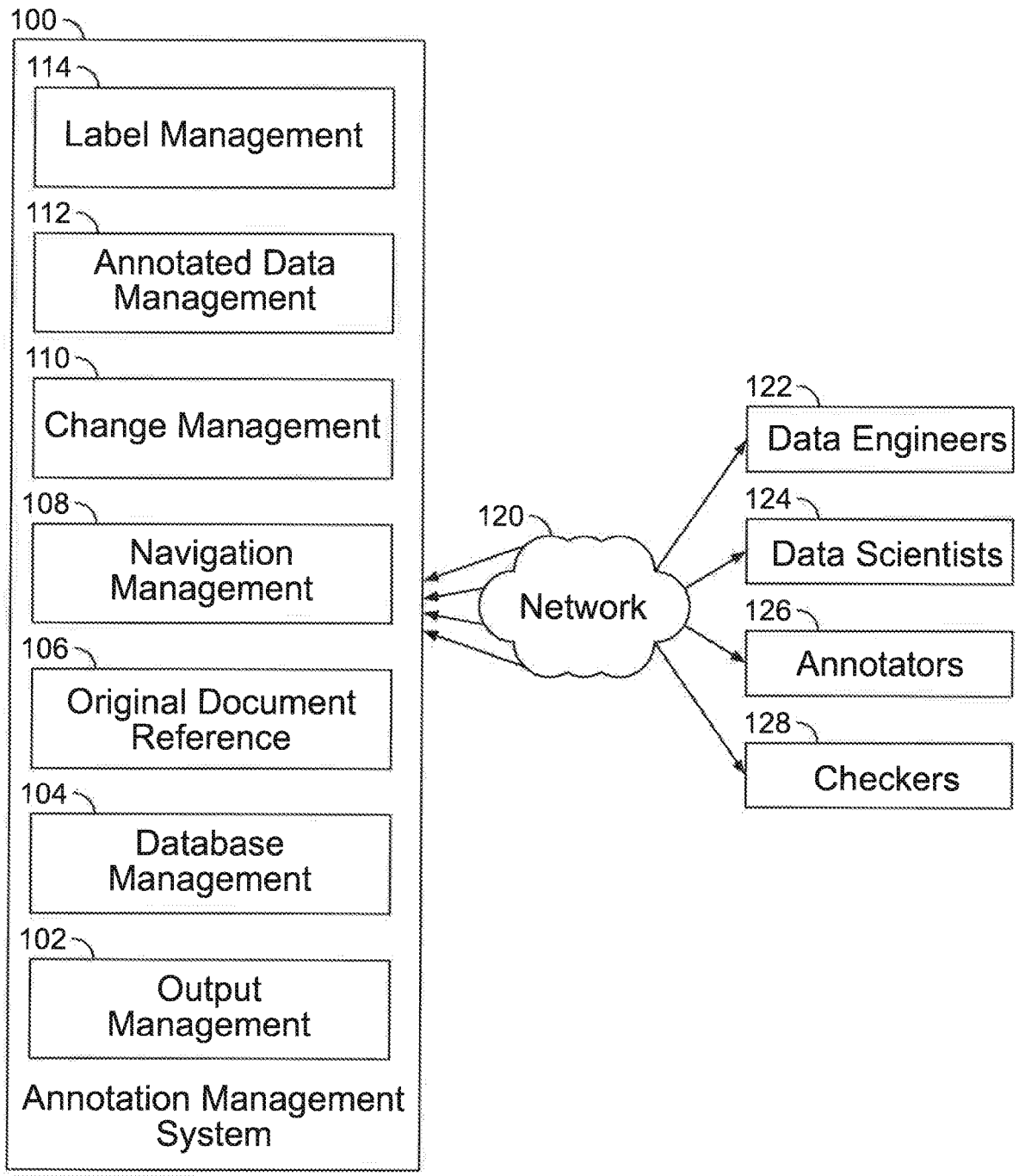
FIG. 1 shows an illustrative system in accordance with principles of the disclosure.

A system for managing concurrent annotation of a body of data is provided. The body of data may include two or more data files. The data files may be text-based or converted to text through any appropriate method. In an embodiment, the data files may be audio, visual, or audiovisual. In an embodiment, the data files may be converted to text through an OCR (optical character recognition) process. Any appropriate OCR method may be used.

The system may include one or more remote computers and a central server. In an embodiment, the central server may be distributed across two or more servers through any appropriate method, such as a distributed ledger (blockchain) algorithm.

Each remote computer may include a communication link that may access a network. The network may be the Internet or an internal network, such as an intranet, without access to the Internet. The network may include the central server and the central server may include one or more databases. One of the databases may store the body of data. The entire body of data may be stored on the remote computer or on a remote server. The server may be centralized or decentralized in various embodiments.

The remote computer may include non-transitory memory that may store a portion of the body of data, an operating system, and an annotation management engine. The remote computer may have one or more processors coupled to the memory and configured to operate the annotation management engine and the operating system. The processor(s) may also communicate results of the annotation management engine over the network and store, in the memory the portion of the body of data and the annotated data. The processor may be a microprocessor.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The microprocessor may control the operation of the system/remote computer and its components, which may include RAM, ROM, an input/output module, and other memory. The microprocessor may also execute all software running on the remote computer—e.g., the operating system and any applications such as an annotation management system and any security protocols. Other components commonly used for computers, such as EEPROM or Flash memory or any other suitable components, may also be part of the system.

The network connections may include a local area network (LAN) and a wide area network (WAN or the Internet), and may also include other types of networks. When used in a WAN networking environment, the system may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology e.g., a hard drive or other non-transitory memory. The memory may store software including an operating system and any application(s) (such as the annotation management system and a web browser) along with any data needed for the operation of the system and to allow annotation of the body of data. The data may also be stored in cache memory, or any other suitable memory. Alternatively, some or all of computer executable instructions (alternatively referred to as "code") may be embodied in hardware or firmware.

An input/output ("I/O") module may include connectivity to a keyboard, monitor, or network interface through which a user, such as an annotator or a checker, of the annotation management system may provide input. The input may include input relating to cursor movement. The input/output module may also include one or more speakers for providing audio output and a video display device, such as an LED screen and/or touchscreen, for providing textual, audio, audiovisual, and/or graphical output.

In an embodiment, a copy of the annotation management engine may be stored on each remote computer using the system. For example, in a remote office setup, each remote computer may have a copy of a word processing program installed. Alternatively, in an embodiment, the annotation management engine is not stored on the remote computer but on a centralized or distributed server; rather, the engine may be accessed by the remote computer and user through a web browser or similar access program. The engine may be located on a centralized server. In an embodiment, the engine, and data, may be distributed across multiple servers.

The annotation management engine, wherever it is located, may include a label management module, an annotated data management module, a change management module, a navigation management module, a database management module, and an output management module. In an embodiment, one or more of the modules is located on the remote computer while the remaining modules are located on a centralized or distributed server. Splitting modules may increase efficiency or reduce power consumption and processing power necessary. In an embodiment, the navigation management module, label management module, and the output management module may be located on the remote computer, while the remaining modules may be located elsewhere, such as on a server.

In an embodiment, the label management module may allow a user, such as an annotator or a checker, to apply and remove one or more labels/annotations to the body of data to create annotated data. For example, an annotator may label/annotate a name as a name, an address as an address, an account number as an account number, a particular item as that item, etc. In an embodiment, the labels/annotations may be used to train an AI/ML algorithm by directing the algorithm to recognize items/text for what they are. Annotated/labeled data may be essential to accurately train AI/ML algorithms.

In an embodiment, the annotated data management module may capture a start index and an end index of the annotated data, and it may allow a user, such as an annotator, to select a status for the annotated data. A start index and end index may allow an annotator or other user to determine where in a data file to begin and end annotating/labeling. A start and end index may allow an annotator or other user to take a break in the middle of labeling/annotating a data file. Selecting a status may help increase collaboration as it may inform other users about the condition of a particular data file in the body of data. For example, an annotator or other user may select a status for a particular data file such as "Active," "Complete," "Delete," and "Needs Further Review."

In an embodiment, the change management module may be configured to capture some or every action performed on a particular data file. For example, the change management module may track every label added or removed, along with a date-time stamp, and user details. User details may include the identifying information of any user (such as an annotator or checker) who has annotated the file, or even simply viewed the file. In an embodiment, the change management module may generate a csv or spreadsheet report for each data file. The csv/spreadsheet may contain details about multiple data files. In an embodiment, these reports may be utilized by checkers, data scientists, annotators, or other users to help train the users, as well as train AI/ML algorithms.

In an embodiment, the navigation management module may allow a user, such as an annotator, checker, or scientist to choose a particular data file of the body of data to be annotated/labeled or viewed. In an embodiment, the navigation management module may automatically skip any data file that has a status of "Active" or "Complete." Automatically selecting the next document for an annotator to annotate/label may save time and avoid duplication of work, and it frees a user from having to manually track which document or file in the body of data has been annotated or not. In an embodiment, the annotation management system may use an AI/ML model to determine which data files to automatically skip. In an embodiment, the annotation management system may determine to automatically skip a data file if its status is marked as, for example, "Complete," or "Checked" or any other appropriate status marker. In an embodiment, the annotation management system may require two or more annotators, or other users, to annotate/label a data file before it may be automatically skipped.

In an embodiment, the database management module may control access to several databases, such as a user database, a project database, an annotation database, and a change management database. The user database may include all of the annotators, checkers, data scientists and engineers, and others who have access to a particular body of data or a particular annotation project. In many situations, access to data may need to be controlled for confidentiality, privacy, or liability purposes. The project database may include one or more annotation or data science projects, or portions of projects. The annotation database may include all of the annotations/labels applied to a data file or multiple data files in one or more projects. The change management database may include any changes made to original data files, including annotations/labels, as well as a history of any change or access to a data file. Each database may generate separate or combined reports of data within the database.

In an embodiment, the output management module may allow a user to download the annotated data file(s) and some or all of the original data files in the body of data in a number of formats. For example, a typical output format may be JSON (Javascript Object Notation), a spaCy format in the Python programming language, or a csv/spreadsheet format. In an embodiment, the output management module may also display any data, functions, data file, annotations/labels, or any other information necessary for a user.

In an embodiment, the annotation management engine may allow multiple annotators to annotate/label the same or separate data files of the body of data. For example, the engine may allow multiple annotators located all over the globe to access and annotate the same body of data at the same time. In an embodiment, the engine may also allow multiple data scientists and checkers to use and check the original and annotated data while multiple annotators are simultaneously annotating the body of data. In an embodiment, two or more annotators may annotate/label a data file at the same time, but as soon as one user saves her annotations/labels, the data file may be locked until those annotations/labels/changes are saved to the appropriate databases. The data file may be unlocked once the save is appropriately handled, and the remaining annotators/labelers may continue their annotation/labeling of the data file. In an embodiment, each user may be able to view what the other users are doing to a data file in real-time.

In an embodiment, the system may include an encryption controller, and the non-transitory memory may include executable instructions and at least one datum configured to authenticate the user. In certain industries, such as medicine and finance, security and confidentiality may be essential. A typical user may need a username and a unique password or PIN to access the engine and body of data. In an embodiment, two-factor authorization may be needed. Other encryption and authentication methods may be used as appropriate.

In an embodiment, the engine and label management module may allow a user to create one or more hotkeys corresponding to one or more labels/annotations and then allow the user to apply the corresponding label when the user selects a particular hotkey. In an embodiment, the hotkey(s) may be shared over the network so other users may use the same hotkeys. Hotkeys may increase efficiency. In an embodiment, a user's hotkeys, or shared hotkeys, may be displayed on a graphical user interface through the output management module or other module.

A method for managing simultaneous/concurrent annotation of a body of data consisting of two or more data files is provided. The method may include storing, at a centralized server, the body of data. In an embodiment, the body of data may be stored at two or more servers, or decentralized servers. In an embodiment, the body of data may be stored as part of a distributed ledger/blockchain.

The method may include receiving, at an annotation management engine, user logins from two or more annotators. The annotation management engine may be at the centralized server (and may be accessed through a web browser or similar access program) or at one or more remote computers. Each user login may enable each annotator to select an available data file from the data files. Each user may select the same available data file as the other user(s). The method may include authenticating each annotator. The method may include displaying, on a monitor near/proximate to each annotator, the selected data file and a graphical user interface. The graphical user interface may allow each annotator to view the data file and annotate the data file. In an embodiment, the graphical user interface may be displayed by an output management module.

The method may include receiving, at the annotation management engine, one or more annotations/labels applied by the first annotator to the data file. Annotations/labels may include, for example, a name as a name, an address as an address, an account number as an account number, a particular item as that item, etc. The annotator may save the labels/annotations. The annotation management engine may include one or more of a: label management module, annotated data management module, change management module, navigation management module, the original data file reference, a database management system, and an output management module. In an embodiment, a copy of the annotation management engine may be located on a remote computer near each annotator. In an embodiment, the annotation management engine may be located at a centralized or decentralized server and accessed through a web browser or other access portal.

The method may include locking, at the annotation management engine and/or any other appropriate location (such as one or more databases), the data file. Locking the data file may transform the data file to an annotated data file and prevent the second (or any other) annotator from applying any annotations/labels to the data file. The method may include updating the body of data with the annotated data file and generating, at the annotation management engine, a history of the annotated data file. In an embodiment, the annotated data file may replace the original data file. In an embodiment, the annotated data file is added to the body of data, and the original data file may still be intact. The history may include the available data file, the annotated data file, the one or more saved labels, an identity of the one or more annotators, and any changes made by the one or more annotators to the available data file. The changes may be time and date stamped as well as annotator/user identity stamped. The history may be stored in a csv format or any other appropriate format.

The method may include unlocking, at the annotation management engine, the data file, allowing the second (or any other) annotator to apply one or more annotations/labels to the data file. For example, two or more annotators may begin working on a single data file, when one saves her annotations, the file may be temporarily locked to prevent the second annotator from applying labels until the first annotator's labels are saved and recorded, at which time the file may be unlocked, allowing the second annotator to apply and save her annotations/labels. After the first annotator's labels/annotations are saved, the method may repeat with the second annotator replacing the first annotator in the method. The method may be repeated for other data files and other users, such as checkers and data scientists.

In an embodiment, the method may include receiving, at the annotation management engine, a user login from a checker, authenticating the checker, and allowing the checker to view the annotated data file and the history to check the accuracy of the annotations/labels. A checker may be a supervisor or other annotator who checks the annotations/labels for accuracy as accurate annotations may be essential for robust AI/ML models. The method may include receiving a confirmation from the checker that the labels are accurate. Alternatively, the checker may correct the labels/annotations, or assign an annotator to correct the labels/annotations. The method may also include storing the confirmation and the annotated data file as a checked data file and updating the body of data with the checked data file. In an embodiment, the history of the file may also be updated with the actions of the checker. In an embodiment, instead of a checker, a data scientist or data engineer may login to the annotation management engine and view the annotated/labeled data files (as well as the original data files) or any other accessible data. The data scientist or engineer may use the annotated data files, original data files, checked data files or any other data file to train an AI/ML algorithm.

In an embodiment, the checker may be able to view the annotated data file in real-time while an annotator, including the first or second annotators, applies one or more annotations/labels to the available data file. Viewing the application of annotations in real-time may save time checking the annotations afterwards. In addition, this may be used as a training tool to train annotators. In an embodiment, annotators and other users may be able to view the actions of a checker in real-time. In an embodiment, every authorized user may be able to view the actions of any other authorized user of the annotation management system in real-time. This may help increase collaboration and efficiency.

In an embodiment, the method may include utilizing the checked data file or any other data file, including the original data file and the annotated/labeled data files, to train an AI/ML algorithm. Training an AI/ML algorithm may be more efficient and accurate with a checked data file.

In an embodiment, the most accurate way to train an AI/ML algorithm may be to repeat the method until the entire body of data includes a checked data file for each of the data files in the entire body of data. Having a complete set of accurate training documents may generate the most accurate AI/ML algorithm. In an embodiment, an AI/ML algorithm may be trained at various stages of the body of data being annotated. This may create multiple versions of the AI/ML algorithm, which may then be compared to each other to determine an optimum amount of training materials. In an embodiment, this determination may be performed by a computer.

In an embodiment, the method may include receiving one or more instructions at the annotation management engine from the first (or any other) annotator to create a hotkey corresponding with a label/annotation. The method may include receiving instructions to apply the label when the hotkey is selected. The method may include sharing the hotkey(s) with the second (or any other) annotator or other user. Sharing hotkeys may increase efficiency of the team. The method may include saving the hotkey(s) on a computer local to the annotator. The method may include saving the hotkey(s) on a centralized or distributed server.

A method for managing concurrent annotation of a body of data consisting of two or more data files is provided. The method may include storing, at a centralized server, the body of data, receiving, at an annotation management engine, a user login from an annotator enabling the annotator to select an available data file from the data files and authenticating the annotator. The annotation management engine may include one or more of a: label management module, annotated data management module, change management module, navigation management module, the original data file reference, a database management system, and an output management module. In an embodiment, a copy of the annotation management engine may be located on a remote computer near each annotator. In an embodiment, the annotation management engine may be located at a centralized or decentralized server and accessed through a web browser or other access portal.

The method may include displaying, on a monitor near the annotator, the selected data file along with or as part of a graphical user interface. The graphical user interface may include a navigation and function taskbar, available labels (including color-coded labels), a historical data section, and the available data file. The annotator may be able to apply one or more of the available labels to the available data file. The graphical user interface may be generated by the output management module, or a different module.

The method may include receiving, at the annotation management engine, one or more saved labels/annotations applied by the annotator to the data file and locking, at the annotation management engine, the data file. The locking of the data file may transform the data file to an annotated data file and prevent any other annotator or user from applying any label s/annotations.

The method may include updating the body of data with the annotated data file and generating, at the annotation management engine, a history of the annotated data file. The history may include the available data file, the annotated data file, the one or more saved labels, an identity of the one or more annotators, time and date-stamps, and any changes made by the one or more annotators to the available data file. The login and authentication steps above may be repeated by a second annotator. The method may include unlocking, at the annotation management engine, the data file, allowing the second annotator to apply one or more labels/annotations to the data file and then repeating the steps of receiving, storing, locking, and updating the history with any changes made by the second annotator.

In an embodiment, the method may include receiving, at the annotation management engine, a user login from a checker, enabling the checker to select the annotated data file and the available data file from the data files. The method may include authenticating the checker, unlocking, at the annotation management engine, the available data file, enabling the checker to check and apply one or more labels to the available data file and the annotated data file. The method may include displaying, on a monitor proximate to the checker, the annotated data file, the available data file, the history, and a graphical user interface. The graphical user interface may include a navigation and function taskbar, available labels (including color-coded labels), a historical data section, and the available data file, as well as any tools unique to a checker or supervisor. The graphical user interface may be generated by the output management module, or a different module. The method may include receiving confirmation from the checker that the labels are accurate and storing the confirmation and the annotated data file as a checked data file. In an embodiment, the checked data file may replace the annotated data file. In an embodiment, the checked data file may be added to the body of data as a separate data file. The method may also include updating the body of data with the checked data file and generating, at the annotation management engine, a history of the checked data file.

In an embodiment, the method may include the ability of the checker, or any other user, to view the annotated data file and the actions of any other user in real-time while the other user annotator applies one or more labels to the available data file or manipulates the data file in any respect.

In an embodiment, the annotators and/or checkers may be computer programs or computer systems instead of people. For example, a previously trained AI/ML algorithm may be able to annotate a body/corpus of data to a degree of accuracy. That AI/ML algorithm, or a different AI/ML algorithm may also be used to check the annotators (human or algorithmic) for accuracy. If an AI/ML algorithm is used instead of an annotator or a checker, a graphical user interface may not be needed for the AI/ML algorithm. In an embodiment, both human annotators and/or checkers and AI/ML annotators or checkers may be used to annotate a body/corpus of data. In this embodiment, the humans and algorithms may check each other's work or they may be compared against each other for various data science purposes.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative diagram of annotation management system 100 connected to users such as a data engineer 122, a data scientist 124, annotators 126, and checkers 128 through a network 120. Network 120 may be the cloud or the Internet. Network 120 may be an internal network such as an intranet. Data engineer 122, a data scientist 124, annotators 126, and checkers 128 may be referred to as data team members.

Annotation management system 100 may be a computer program installed on a remote computer or installed on a centralized server. In an embodiment, the system 100 may be installed on a distributed server network. In an embodiment, annotation management system 100 may be accessed through a web browser or other appropriate access program, such as a remote desktop environment. In an embodiment, multiple data engineers 122, data scientists 124, annotators 126, and checkers 128 may access the annotation management system 100 at the same time through network 120. This may allow collaboration between remote users.

Annotation management system 100 may operate in a networked environment supporting connections to one or more remote computers and servers, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

It will be appreciated that any network connections shown or not shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with data, to any suitable computer system. The computer-readable instructions may be to store data or instructions in cache memory, the hard drive, secondary memory, or any other suitable memory.

Annotation management system 100 may include computer executable instructions for invoking user functionality related to performing various tasks. In an embodiment, annotation management system 100 may be a cloud-based application.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Annotation management system 100 may enable a data engineer 122, a data scientist 124, annotators 126, and checkers 128 to annotate/label and use data files (not shown) in a body of data (not shown). These annotations/labels may be useful when training an AI/ML algorithm.

Annotation management system 100 may include a label management module 114, an annotated data management module 112, a change management module 110, a navigation management module 108, an original document reference 106, a database management module 104, and an output management module 102.

Label management module 114 may allow users, such as annotators 126, to apply various labels/annotations to data files in a body of data. Users, such as annotators 126 or checkers 128 may add a new label, update/change an existing label, or delete an existing label. Data files may be text based, audio, visual, audio-visual, or any other appropriate format. In an embodiment, data files may go through an OCR (optical character recognition) process to allow annotators 126 or other users to select particular data in a data file.

In an embodiment, label management module 114 may allow users to create and use various hotkeys to shorten the annotation/label process. In an embodiment, the hotkeys may be shared with other users, such as annotators 126 and checkers 128.

Annotated data management module 112 may capture, or allow a user to create, start and end indexes of data files, included annotated data files. In an embodiment, module 112 may allow a user, such as an annotator 126 or checker 128, to select a status for the annotated data. For example, an annotator 126 or other user may select a status for a particular data file such as "Active," "Complete," "Delete," and "Needs Further Review."

In an embodiment, change management module 110 may capture all change and view data of a particular file or files. For example, module 110 may capture the status of a file, when the file was changed by an annotator 126 adding/changing/deleting a label/annotation, along with date and time-stamps and user identification details. In addition, module 110 may capture and make a notation every time a particular file is viewed, even if no action is taken on the file.

In an embodiment, navigation management module 108 may allow users, such as data scientists 124, annotators 126, and checkers 128 to navigate directly between various data files in the body of data, without accessing the body of data directly. In an embodiment, the module 108 may automatically skip data files in the body of data that have already been annotated/labeled by other users.

In an embodiment, the annotated management system 100 may allow an annotator 126, checker 128, data scientist 124, or data engineer 122 access to an original data file in the body of data with original document reference 106. The original document reference 106 may be before any OCR process (or other transformation process) was performed on the data file. Reference 106 may be useful when confirming/checking the accuracy of various labels/annotations.

In an embodiment, data management module 104 may allow a user, such as an annotator 126, checker 128, data scientist 124, or data engineer 122 access to various databases. Module 104 may facilitate storing, searching, and transfer of data files in the body of data. databases may include, inter alia, a user database, a project database, an annotation database, and a change management database.

In an embodiment, output management module 102 may be located on a user's remote computer as opposed to within a remote server. Output management module 102 may include a graphical user interface. Module 102 may manage the output of annotated files in various formats, including inter alia JSON, spaCy, and csv formats. In an embodiment, users may have the option of selecting one or more formats for outputting/downloading files.

Figure 2:
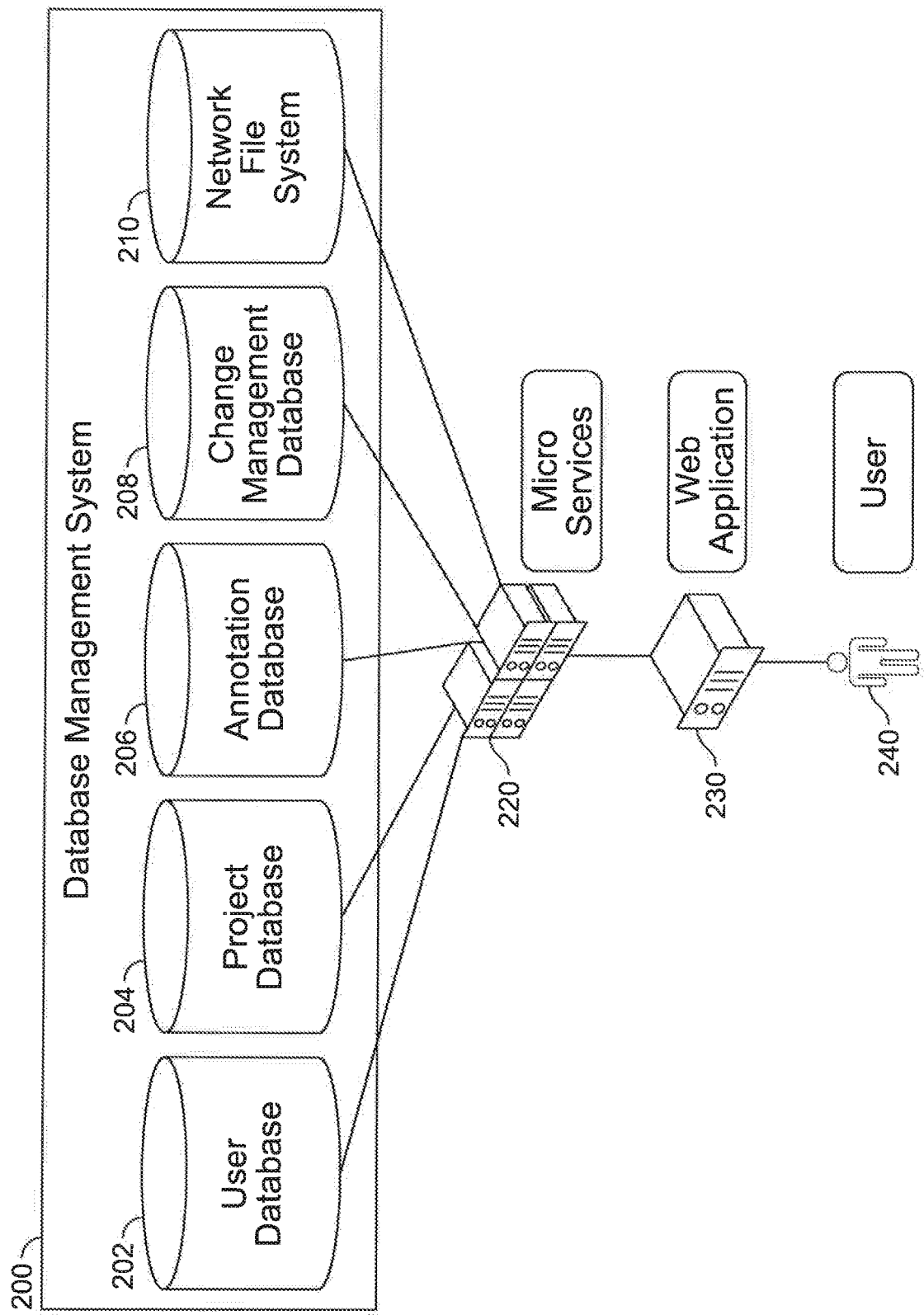
FIG. 2 shows an illustrative system in accordance with principles of the disclosure.

FIG. 2 shows an illustrative database management system 200 in accordance with principles of the disclosure. In an embodiment, database management system 200 may be database management module 104 of FIG. 1.

Database management system 200 may assist in and ease the storing, searching, and transfer of data files (not shown) from and to a body of data (not shown). System 200 may include a user database 202, a project database 204, an annotation database 206, a change management database 208 and a network file system 210.

In an embodiment, user(s) 240 may access the system 200 through a web application/browser 230. In turn, the web application 230 may access the system 200 through micro-services 220. Micro-services 220 may control access to system 200 and databases 202, 204, 206, 208, and 210 instead of directly linking the web application 230. In an embodiment, micro-services 220 may run on a different server than web application 230.

User(s) 240 may be annotators, checkers, data scientists, data engineers, or any other authorized user.

In an embodiment, user database 202 may manage the allowed users of the system 200. Database 202 may control the authentication and access privileges of specific users to system 200 and the other databases shown to control confidentiality, privacy, and general access.

In an embodiment, project database 204 may include, and manage, various annotation projects. Authorized users 240 may access and work (annotate/label, check, use data files) with only authorized projects.

In an embodiment, annotation database 206 may include the annotated files (not shown). In an embodiment, database 206 may also include a comparison between annotated files (not shown) and the original data files (not shown). In an embodiment, database 206 may also include a link to the original data files.

In an embodiment, change database 208 may track any and all changes made to an original data file, including annotations/labels, time and date-stamps, annotator identity and any user 240 identity. Any detail regarding a data file may be tracked with database 208, including if any user 240 simply viewed the data file without making any changes.

In an embodiment, network file system 210 may store the original data files of a body of data. System 210 may be physically or electronically linked to one or more of databases 202, 204, 206, and 208. In an embodiment, to increase security, system 210 (i.e., the actual original data files) may be separated from one or more of databases 202, 204, 206, and 208, and may only be accessed by authorized user(s) 240.

FIGS. 3-1, 3-2*a*, 3-2*b*, 3-3, and 3-4 show illustrative records in accordance with principles of the disclosure.

Figure 3:
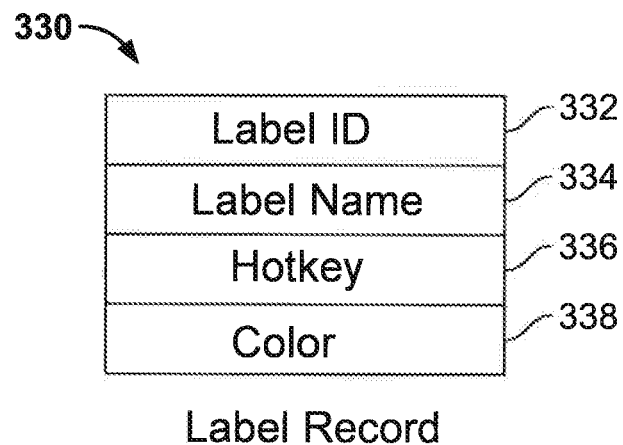

In an embodiment, as shown in FIG. 3-1, user record 300 may include a user ID 302, a first name 304, a last name 306, an email address 308, a status 310, a username 312, and a password 314.

Each user record 300 may represent a unique user of the invention. In an embodiment, each user may need to create an online account before using the invention. User ID 302 may be an integer field and the primary key, and may identify each unique user in the system. First name 304, last name 306, and email address 308 may be string fields representing a user. Status 310 may be a string field to record the state of a user as active or inactive. Username 312 may be a unique string field selected by each user (or assigned by an organization) to login to system. Password 314 may be an encrypted text field selected by user to login to the system.

In an embodiment, as shown in FIG. 3-2*a*, a project record 320 may represent a unique project and include integer project ID 322, string project name 324, and date/time 326 when the project was created.

In an embodiment, as shown in FIG. 3-2*b*, a user-project record 327 may include integer user ID 328 and integer project ID 329. Record 327 may be used to identify which user(s) is assigned to which project(s). A user assigned to a project may be allowed to access that project, but not a project to which the user is not assigned.

In an embodiment, as shown in FIG. 3-3, a label/annotation record 330 may include a label ID 332, a label name 334, a hotkey 336, and a color 338. A user may create a label record 330, or multiple labels, to ease annotation of data files.

Figures 3, 4:
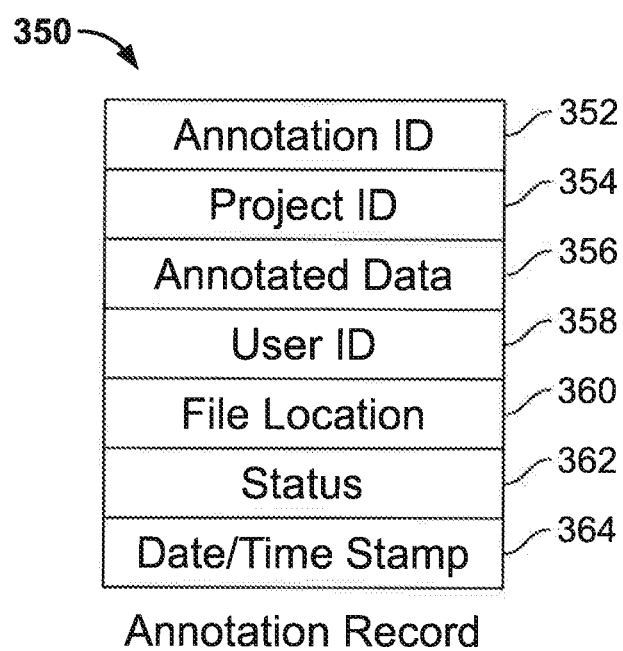

In an embodiment, as shown in FIG. 3-4, an annotation record 350 may be used to store label/annotation details in an annotation database. An annotation record 350 may include one or more of the following fields: annotation ID 352, project ID 354, annotated data 356, user ID 358, file location 360, status 362, and date/time stamp 364. Status 362 may be, for example, "Active," "Complete," "Incomplete," or "checked," etc. File location 360 may be a string field which may point to the actual physical location of a data file in a body of data. The location could be on a same or different server as the record 350. Date/Time stamp 364 may be a string field that may record the date and time when a user created the annotation record.

Record 350 may include all of the necessary data for an annotated data file to be used to train an AI/ML algorithm or to be annotated by an annotator.

Figures 3, 4, 5:
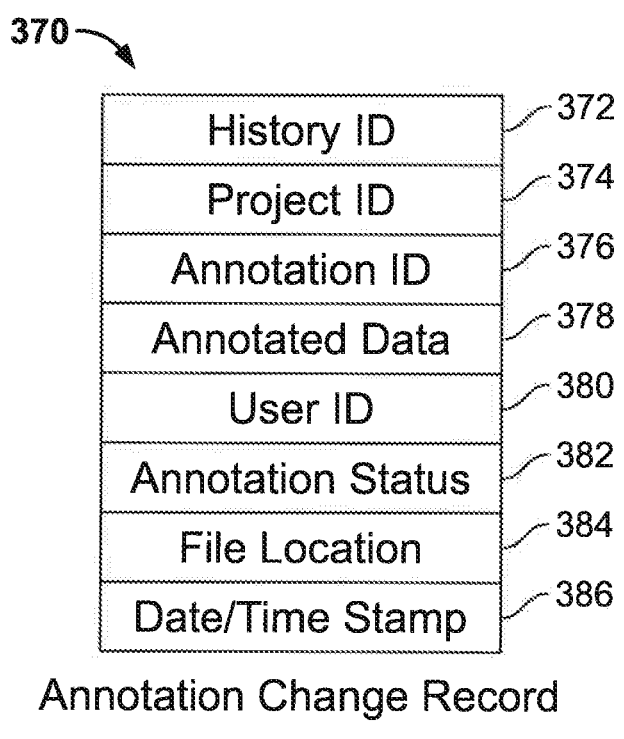
Figure 4:
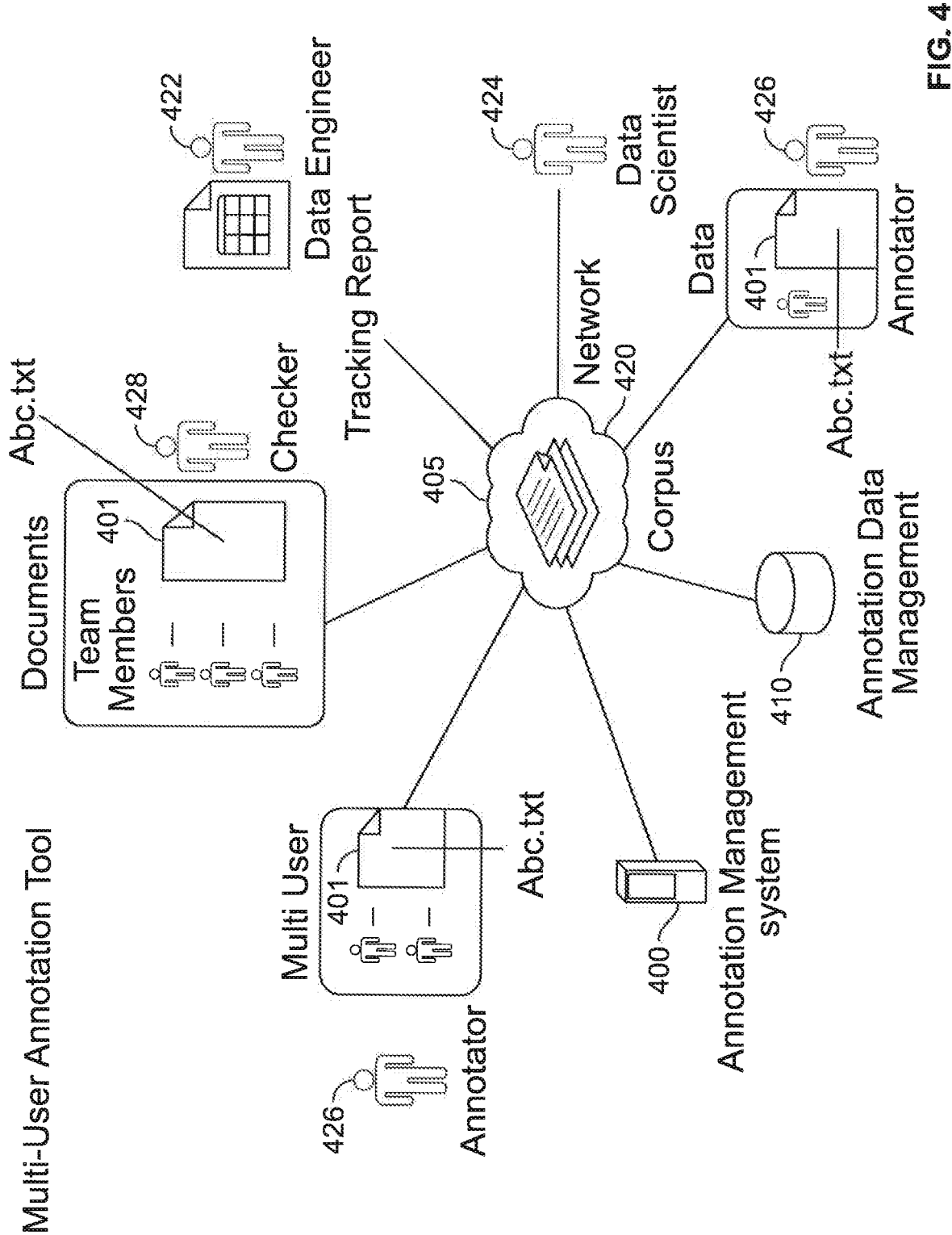
Figure 5:
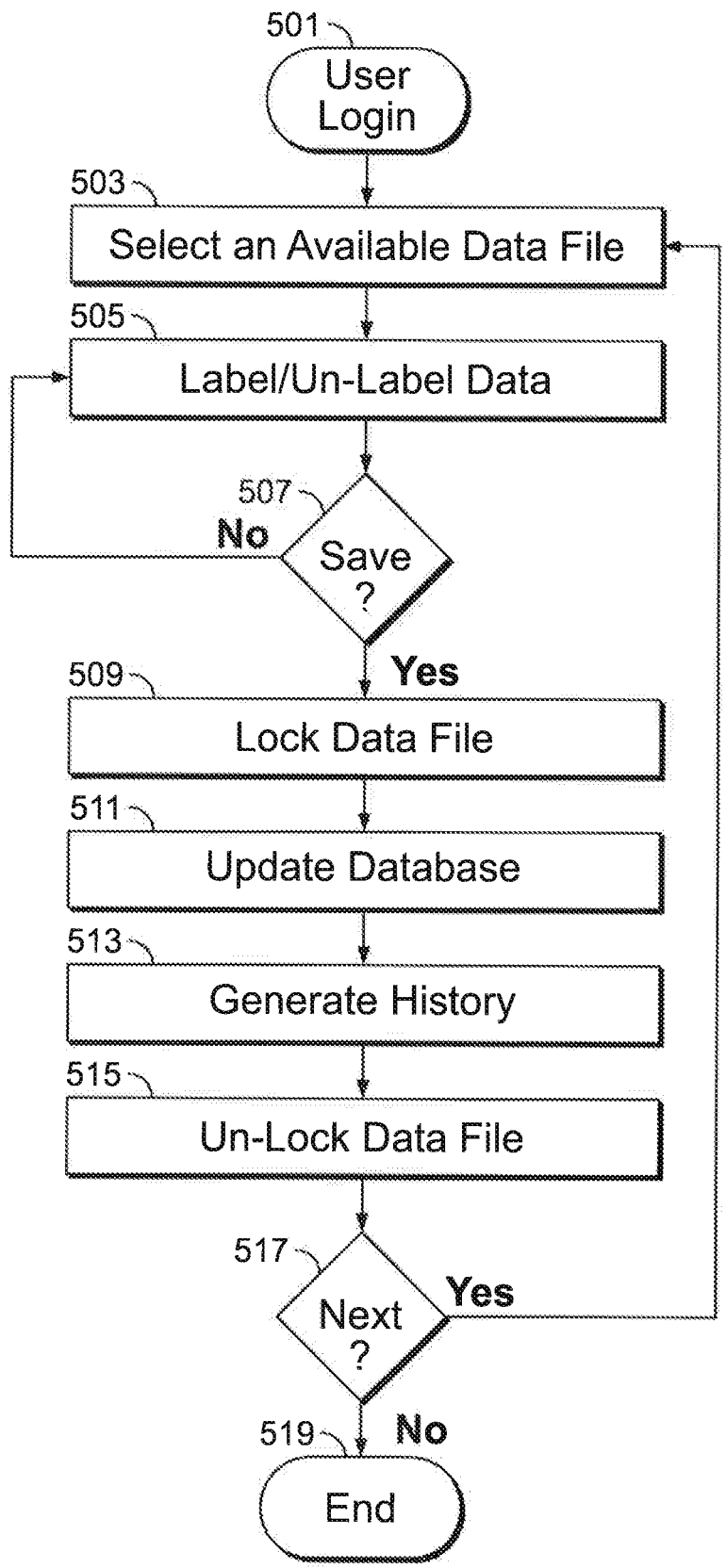

In an embodiment, as shown in FIG. 3-5, an annotation change record 370 may include a history ID 372, project ID 374, annotation ID 376, annotation data 378, user ID 380, annotation status 382, file location 384, and/or date/time stamp 386.

History ID 372 may contain an integer value that identifies each change record 370 in a database. Project ID 374 may be an integer value referring to a project the data file belongs to. Annotation ID 376 may be an integer field pointing to an annotation record (such as shown in FIG. 3-4) in an annotation database. Annotated data 378 may be object data, and may contain a start index, an end index, one or more labels and values of an annotation record. User ID 380 may be a reference to a user record in a user database, identifying the user who made a change to the annotation file. Annotation status 382 may be a string field that may capture details about an annotation change. For example, the status may be: label is added, updated or deleted. File location 384 may be a string field which may point to the actual physical location of a data file in a body of data. The location could be on a same or different server as the record 370. Date/Time stamp 386 may be a string field that may record the date and time when a user created the annotation record.

FIG. 4 shows an illustrative diagram in accordance with principles of the disclosure. Multiple users, such as annotators 426, checkers 428, data engineers 422, data scientists 424, may simultaneously interact with and annotate/check/use a data file 401 from a body of data 405.

In an embodiment, annotators 426, checkers 428, data engineers 422, data scientists 424 may be connected to annotated management system 400 and an annotation data management database 410, along with the body of data 405 through network 420.

FIG. 5 shows an illustrative flowchart in accordance with principles of the disclosure. Methods may include some or all of the method steps numbered 501 through 519. Methods may include the steps illustrated in FIG. 5 in an order different from the illustrated order. The illustrative method shown in FIG. 5 may include one or more steps performed in other figures or described herein. Steps 501 through 519 may be performed on the apparatus shown in FIGS. 1 and 2, or other apparatus.

At step 501, a user may login to an annotation management system. In an embodiment, the user may be an annotator, a checker, a data scientist, or a data engineer. In an embodiment, the login may simply be a username and password. In an alternative embodiment, the login may utilize a more secure method, such as two-factor authorization.

At step 503, the user may select an available data file for annotation/labeling. The available data file may be from all or a portion of a body of data available to the annotation management system.

At step 505, the user may label/annotate the available data file, or remove a label/annotation. At step 507, the user may decide to save the labels/annotations, or discard and provide different labels/annotations.

At step 509, if the labels/annotations are saved, the annotation management system may lock the data file to prevent other users from labeling/annotating at the same exact time and creating a conflict.

At step 511, the annotation management system may update the database and body of data with the labels/annotations. In an embodiment, the locking at step 509 may create an annotated data file, which is added to the database, forming an original data file and an annotated data file.

At step 513, the annotation management system may generate a history report of the labels/annotations and other data regarding the data file(s). In an embodiment, the history report may include both the original file and the annotated data file.

At step 515, the annotation management system may unlock the data file so that a different user may view, label/annotate, or modify the file. At step 517, the user may choose to work on a new file and the method may restart at step 503. If the user decides to not work on a new file, the method may end at step 519.

FIG. 6 shows an exemplary table in accordance with principles of the disclosure. The table 601 shows various exemplary details and formatting available to annotators, checkers, engineers and scientists, as well as other users. For example, labels may include a social security number, an account number, a name, a date, and an address. Each of these labels may be a different type, such as numbers or letters, various date formats, or a mixture. Formats of each entry may vary as well. In an embodiment, the label or data may be masked. For example, a financial institution may annotate data files containing sensitive, confidential data such as a account numbers and social security numbers. Masked data may only be visible to the annotator and checker, but be masked to the data scientists and data engineers. In an embodiment, masked data may be encrypted.

In an embodiment, if an annotator has incorrectly labeled/annotated a data file, a checker/validator may correct the incorrect label.

Figure 7:
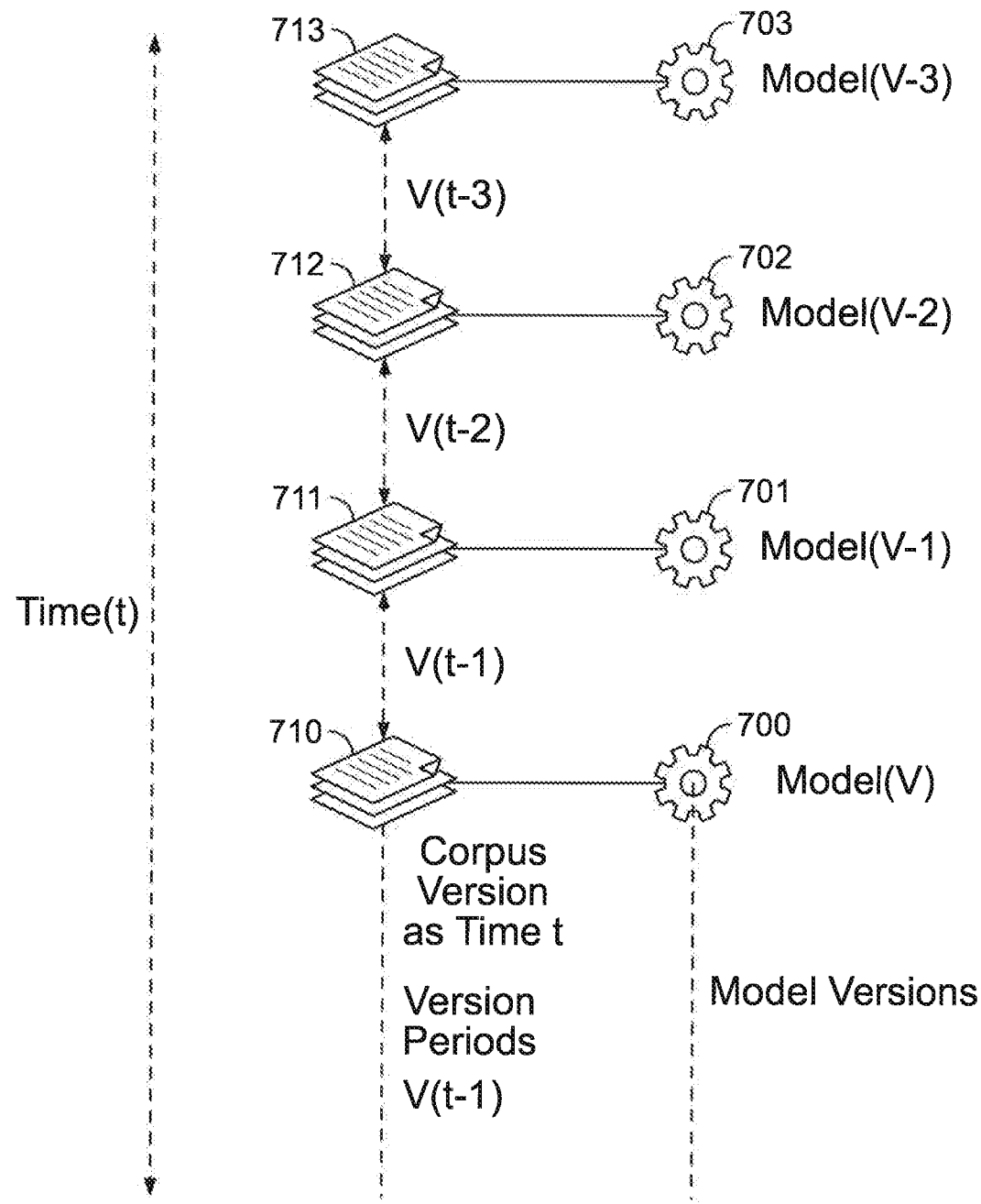
FIG. 7 shows an illustrative process in accordance with principles of the disclosure.

FIG. 7 shows an illustrative process in accordance with principles of the disclosure. In an embodiment, an AI/ML model or algorithm may be trained with different sets of annotated data. For example, AI/ML model 700 at time t may be trained with annotated data 710 at time t. Older model 701 at time t-1 may be trained with annotated data 711. Similarly, model 702 at time t-2 and model 703 at time t-3 may be trained with annotated data 712 and 713, respectively.

In an embodiment, annotated data sets 710, 711, 712, and 713 are different versions of the same set of data. In an alternative embodiment, annotated data sets 710, 711, 712, and 713 are different versions of different sets of data. Using multiple versions of annotated data for training may increase the accuracy and efficiency of AI/ML algorithms. In addition, using multiple versions of annotated data may allow for comparison of the efficacy and efficiency of various annotations/labels.

FIG. 8 shows an exemplary user interface in accordance with principles of the disclosure. In an embodiment, a graphical user interface 800 may include a toolbar/navigation bar 820, annotated data 830, an output pane 840, and tags/labels 810.

In an embodiment, toolbar/navigation bar 820 may include various icons with various functionality, such as a save button, an erase button, a history button, a next button, and an 'add label' button. In an embodiment, tags/labels 810 may be color coded, with each separate tag/label a different color. Color coding may increase visual throughput and efficiency.

Thus, apparatus and methods for annotation management have been provided. Persons skilled in the art will appreciate that the present invention can be practiced by other than the described embodiments, which are presented for purposes of illustration rather than of limitation.

What is claimed is:

1. A method for managing concurrent annotation of a body of data comprising a plurality of data files, the method comprising:
   (a) storing, at a centralized server, the body of data;
   (b) receiving, at an annotation management engine, a user login from an annotator, said user login enabling the annotator to select an available data file from the plurality of data files;
   (c) authenticating the annotator;
   (d) displaying, on a monitor proximate to the annotator, the selected available data file and a graphical user interface;
   (e) receiving, at the annotation management engine, one or more saved labels applied by the annotator to the available data file;
   (f) locking, at the annotation management engine, the available data file, said locking transforming the available data file to an annotated data file and preventing a different annotator from applying one or more saved labels;
   (g) updating the body of data with the annotated data file;
   (h) generating, at the annotation management engine, a history of the annotated data file;
   (i) receiving, at an annotation management engine, a user login from a checker while the annotator is labeling the available data file, said user login enabling the checker to select the annotated data file and the available data file from the plurality of data files;
   (j) authenticating the checker;
   (k) unlocking, at the annotation management engine, the available data file, said unlocking allowing the checker to check and apply one or more labels to the available data file;
   (l) displaying, on a monitor proximate to the checker, the annotated data file, the available data file, the history, and a graphical user interface;
   (m) receiving confirmation from the checker that the labels are accurate;
   (n) storing the confirmation and the annotated data file as a checked data file;
   (o) updating the body of data with the checked data file; and
   (p) generating, at the annotation management engine, a history of the checked data file;
   wherein the history includes the available data file, the annotated data file, the one or more saved labels, an identity of the one or more annotators, and any changes made by the one or more annotators to the available data file, and
   wherein the annotation management engine, through an artificial intelligence/machine learning ("AI/ML") algorithm automatically determines available data files of the plurality of data files.

2. The method of claim 1 wherein the graphical user interface comprises:
   a navigation and function taskbar;
   available labels;
   a historical data section; and
   the available data file;
   wherein the annotator and the checker can apply one or more of the available labels to the available data file.

3. The method of claim 2 wherein the available labels are color-coded.

4. The method of claim 1 wherein at least steps (b), (e), (g), (i), (m), and (o) are performed over a network.

5. The method of claim 4 wherein the network is an internal intranet.

6. The method of claim 4 wherein the network is the Internet.

7. The method of claim 1 wherein the annotator accesses the annotation management engine through a web browser.

8. The method of claim 1 wherein the annotation management engine further comprises an encryption controller.

9. The method of claim 1 further comprising the step of creating one or more hotkeys corresponding to one or more labels and applying the corresponding label when the hotkey is selected by the annotator.

10. The method of claim 9 wherein the one or more hotkeys are shared over a network.

11. The method of claim 1 further comprising the step of using the checked data file to train a machine learning algorithm.

12. The method of claim 1 further comprising repeating the method until the body of data includes a checked data file for each of the plurality of data files of the body of data.

* * * * *